US009577716B2

United States Patent
Nambord et al.

(10) Patent No.: US 9,577,716 B2
(45) Date of Patent: Feb. 21, 2017

(54) AVOIDING NFC COMMUNICATION COLLISIONS BETWEEN ACCESSORIES AND USER EQUIPMENT

(71) Applicant: Sony Corporation, Tokyo (JP)

(72) Inventors: Magnus Nambord, Lund (SE); Emil Hansson, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 191 days.

(21) Appl. No.: 14/401,727

(22) PCT Filed: Feb. 18, 2014

(86) PCT No.: PCT/JP2014/000833
§ 371 (c)(1),
(2) Date: Nov. 17, 2014

(87) PCT Pub. No.: WO2015/114688
PCT Pub. Date: Aug. 6, 2015

(65) Prior Publication Data
US 2016/0269079 A1 Sep. 15, 2016

Related U.S. Application Data

(60) Provisional application No. 61/933,634, filed on Jan. 30, 2014.

(51) Int. Cl.
*H04M 1/725* (2006.01)
*H04B 5/00* (2006.01)
(Continued)

(52) U.S. Cl.
CPC ............ *H04B 5/0037* (2013.01); *G06F 1/1628* (2013.01); *G06K 19/0727* (2013.01);
(Continued)

(58) Field of Classification Search
CPC ........... H04B 1/00; H04B 1/04; H04B 1/0458;
H04B 1/3838; H04B 5/00; H04B
5/02; H04B 7/06; H04B 2001/0416; H04B
5/0037; H04B 5/0075; G06K
19/00; G06K 19/0727; G06K 19/07771;
H04W 88/00; H04M 1/7253; H04M
1/72561; H04M 1/04; H04M 2250/04
See application file for complete search history.

(56) References Cited

U.S. PATENT DOCUMENTS 8,798,536 B2 * 8/2014 Behin .................. H04B 5/02
343/855
2013/0152678 A1 6/2013 Hayashi et al.
(Continued)

OTHER PUBLICATIONS

International Preliminary Report on Patentability, Application No. PCT/JP2014/000833, Apr. 15, 2016.
(Continued)

*Primary Examiner* — Thanh Le
(74) *Attorney, Agent, or Firm* — Myers Bigel, P.A.

(57) ABSTRACT

An accessory for a user equipment (UE) includes a housing and a near field communication (NFC) circuit. The housing is slid on the UE to become attached in a stored position relative to the UE. The NFC circuit is attached at a location on the housing and configured to become powered by inductive coupling to signals emitted by another NFC circuit within the UE to temporarily operate to transmit data to the other NFC circuit within the UE as the accessory NFC circuit passes over the other UE NFC circuit while the housing is being slid on the UE before reaching the stored position relative to the UE. While the housing is in the stored position relative to the UE, the NFC circuit may be configured to be inhibited from transmitting data to the other NFC circuit within the UE irrespective of whether the other NFC
(Continued)

circuit within the UE is emitting signals to attempt to provide inductive coupling to the NFC circuit.

20 Claims, 4 Drawing Sheets

(51) Int. Cl.
G06F 1/16 (2006.01)
H04M 1/04 (2006.01)
G06K 19/07 (2006.01)
G06K 19/077 (2006.01)

(52) U.S. Cl.
CPC ..... *G06K 19/07771* (2013.01); *H04B 5/0031* (2013.01); *H04B 5/0075* (2013.01); *H04M 1/04* (2013.01); *H04M 1/7253* (2013.01); *H04M 1/72561* (2013.01); *H04M 1/72575* (2013.01); *H04M 2250/04* (2013.01)

(56) References Cited

U.S. PATENT DOCUMENTS

| | | |
|---|---|---|
| 2013/0309964 A1 | 11/2013 | Hall et al. |
| 2013/0309966 A1 | 11/2013 | Aldana et al. |
| 2013/0311372 A1 | 11/2013 | Ramaci |
| 2016/0043752 A1* | 2/2016 | Slater .................. H04B 1/0458 375/297 |

OTHER PUBLICATIONS

Written Opinion of the International Preliminary Examining Authority, Application No. PCT/JP2014/000833, Jan. 13, 2016.
International Search Report and Written Opinion of the International Searching Authority, PCT Application No. PCT/JP2014/000833, Oct. 15, 2014.

* cited by examiner

AVOIDING NFC COMMUNICATION COLLISIONS BETWEEN ACCESSORIES AND USER EQUIPMENT

CROSS REFERENCE TO RELATED APPLICATIONS

This application is a 35 U.S.C. §371 national stage application of PCT International Application No. PCT/JP2014/000833, filed on Feb. 18, 2014, which itself claims priority to U.S. Provisional Application No. 61/933,634, filed Jan. 30, 2014, the disclosure and content of both of which are incorporated herein by reference in their entirety as if set forth fully herein.

TECHNICAL FIELD

The present invention relates to wireless communication user equipment and, more particularly, to mobile phones and related accessories such as covers that are attachable to mobile phones.

BACKGROUND ART

Near field communication (NFC) circuits are now commonly used for many business applications. For example, NFC tags are attached to products to attempt to prevent theft from businesses, to track product inventory within a business, and to wirelessly communicate information relating to the product to user equipment having a NFC circuit. With the proliferation of NFC circuits, collisions may occur when a user equipment attempts to read one NFC circuit but unintentionally activates other nearby NFC circuits which all transmit overlapping signals that can sufficiently interfere to become unreceivable by the user equipment.

SUMMARY

One embodiment of the present disclosure is directed to an accessory for a user equipment (UE). The accessory includes a housing and a near field communication (NFC) circuit. The housing is slid on the UE to become attached in a stored position relative to the UE. The NFC circuit is attached at a location on the housing and configured to become powered by inductive coupling to signals emitted by another NFC circuit within the UE (UE NFC circuit) to temporarily operate to transmit data to the UE NFC circuit as the accessory NFC circuit passes over the UE NFC circuit while the housing is being slid on the UE before reaching the stored position relative to the UE.

In a further embodiment, the NFC circuit may be further configured to become powered by inductive coupling to signals emitted by the UE NFC circuit to temporarily operate to transmit data to the UE NFC circuit as the NFC circuit passes over the UE NFC circuit while the housing is being slid off the UE.

In a further embodiment, while the housing is in the stored position relative to the UE, the NFC circuit is inhibited from transmitting data to the UE NFC circuit irrespective of whether the UE NFC circuit is emitting signals to attempt to provide inductive coupling to the NFC circuit.

In a further embodiment, while the housing is in the stored position relative to the UE, the NFC circuit is too remotely located from the UE NFC circuit to be sufficiently powered by any inductive coupling to signals emitted by the UE NFC circuit to operate the transmit data.

In a further embodiment, the housing has a top that is adjacent an ear speaker of the UE and a bottom that is adjacent a microphone of the UE while the housing is in the stored position relative to the UE, and the NFC circuit is located adjacent the bottom of the housing and remote from the UE NFC circuit located adjacent the ear speaker of the UE.

The accessory may be a cover configured to protect a back surface of the UE and/or may be a stand that supports and holds the UE in a defined orientation.

The NFC circuit (110) may include a pair of antennas, a transceiver, and a signal comparator and charging circuit. Each antenna is configured to be inductively coupled to the UE NFC circuit. The transceiver may be configured to be powered by at least one of the pair of antennas to operate to transmit data through at least one of the pair of antennas to the UE NFC circuit. The signal comparator and charging circuit is connected to the pair of antennas and configured to prevent the transceiver from transmitting data to the other NFC circuit within the UE until subsequently triggering the transceiver to transmit data to the other NFC circuit based on comparison of relative levels of signals from the pair of antennas.

The pair of antennas may extend in opposite directions from each other. One of the pair of antennas may extend in a first direction along which the housing is slid on the UE and the other one of the pair of antennas extend in an opposite second direction.

In some further embodiments, the signal comparator and charging circuit may be configured to trigger the transceiver to transmit data to the UE NFC circuit based on a difference between the levels of signals from the pair of antennas being within a defined range. The signal comparator and charging circuit may be configured to trigger the transceiver to transmit data to the UE NFC circuit when comparison of relative levels of the signals from the pair of antennas indicates that the UE NFC circuit is presently positioned equally distant from the pair of antennas. The signal comparator and charging circuit may be configured to trigger the transceiver to transmit data to the other NFC circuit within the UE when comparison of relative levels of signals from the pair of antennas indicates that the UE NFC circuit has reached a closest distance to the NFC circuit as the housing is being slid on the UE before reaching the stored position relative to the UE.

In some further embodiments, the accessory includes a conductive signal shield attached at a location on the housing that is between the NFC circuit and the other NFC circuit within the UE while the housing is in the stored position relative to the UE to decrease inductive coupling of the NFC circuit to signals emitted by the UE NFC circuit and substantially prevent the NFC circuit from transmitting data while the housing is in the stored position relative to the UE. The accessory may include an antenna configured to be inductively coupled to the UE NFC circuit, and a transceiver configured to be powered by the antenna to operate to transmit data through the antenna to the UE NFC circuit. The conductive signal shield may extend between the antenna and the UE NFC circuit to inhibit inductive coupling between the antenna and the UE NFC circuit while the housing (102) is in the stored position relative to the UE. The antenna may be a conductive line pattern extending along a plane, and the conductive signal shield may extend across the plane to cover one side of the conductive line pattern.

In a further embodiment, the NFC circuit is configured to delay transmission of the data to the UE NFC circuit until expiration of a defined delay time after the NFC circuit becomes sufficiently powered on to operate. The NFC circuit may be configured to receive a delay setting signal transmitted by the UE NFC circuit, and to set the defined delay time based on the delay setting signal.

In a further embodiment, the NFC circuit is configured to transmit a universal resource locator address as the data to the UE NFC circuit that indicates where the UE can obtain information from a network node of a communications system. The NFC circuit may be configured to transmit a product code as the data to the UE NFC circuit that activates functionality within the UE.

Other accessories and user equipment according to other embodiments will be or become apparent to one with skill in the art upon review of the following drawings and detailed description. It is intended that all such additional accessories and user equipment be included within this description, be within the scope of the present invention, and be protected by the accompanying claims.

BRIEF DESCRIPTION OF DRAWINGS

Aspects of the present disclosure are illustrated by way of example and are not limited by the accompanying drawings. In the drawings.

DESCRIPTION OF EMBODIMENTS

In the following detailed description, numerous specific details are set forth in order to provide a thorough understanding of embodiments of the invention. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Figure 1:
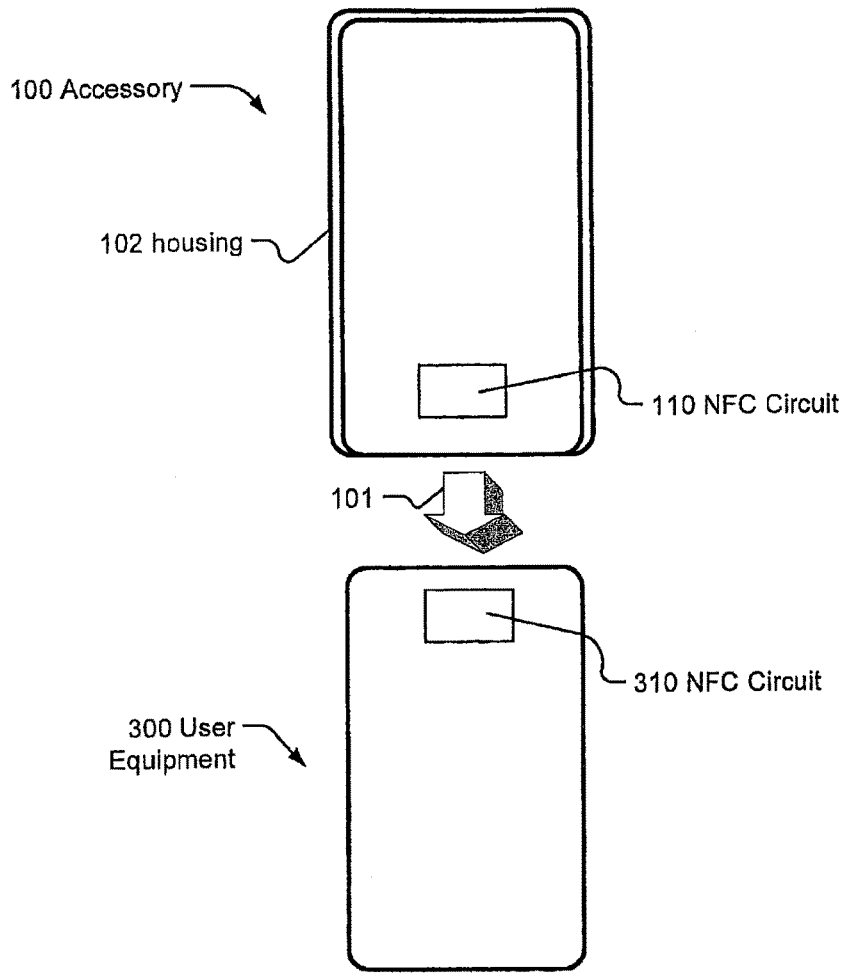
FIG. 1 illustrates an accessory, such as a cover or stand, that slides on a user equipment, where each has a NFC circuit according to some embodiments.
Figure 2:
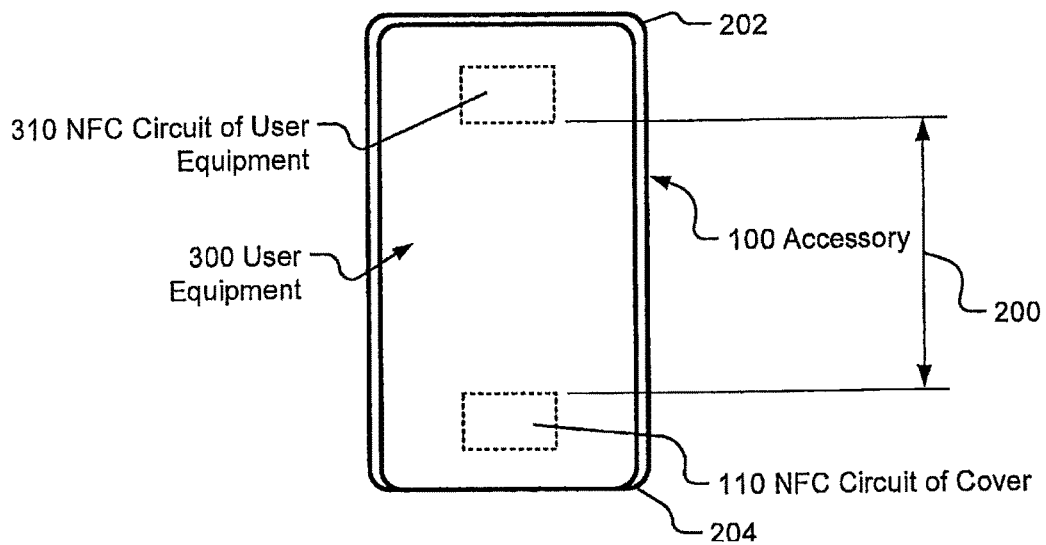
FIG. 2 illustrates the accessory attached in a stored position relative to the user equipment of FIG. 1 according to some embodiments.

Various embodiments of the present disclosure are directed to an accessory for a user equipment ("UE"). FIG. 1 illustrates an accessory 100 that is configured according to some embodiments for use with a UE 300. The accessory 100 includes a housing 102 that slides (e.g., along direction 101) on the UE 300 to become attached in a stored position relative to the UE 300. FIG. 2 illustrates the accessory 100 attached in a stored position relative to the UE 300 of FIG. 1 according to some embodiments.

In one embodiment, the housing 102 has raised edge surfaces along at least two sides that form a central recessed surface area that extends to a recessed end of the housing to receive the UE 300 slid through the recessed end of the housing toward the stored position where the raised edge surfaces engage and retain the UE 300 in the stored position.

The accessory 100 may be a cover that, for example, protects a back surface of the UE 300, or a stand, such as a handsfree phone accessory, that supports and holds the UE 300 in a defined orientation. The UE 300 may be a cellular phone, a tablet computer, a palmtop computer, a mobile music/video player, or any other electronic device.

The accessory 100 has a NFC circuit 110 (referred to as the "accessory NFC circuit 110") that is located on the housing 102, and may be at least partially disposed within the housing 102 or reside entirely within the housing 102. The UE 300 has another NFC circuit 310 (referred to as the "UE NFC circuit 310"). Thus, depending upon the proximity and configuration of the NFC circuits 110 and 310 while the accessory 100 is attached in the stored position relative to the UE 300, the accessory NFC circuit 110 may interfere with the ability of the UE NFC circuit 310 to communicate with a NFC circuit of a targeted device (e.g., a point of sale credit card processing terminal, a NFC tag on a product, etc.) which a user is attempting to communicate with through the UE 300.

For example, absent use of various embodiments disclosed herein, the accessory NFC circuit 110 could be positioned between the UE NFC circuit 310 and the NFC circuit of the targeted device, and located much closer to the UE NFC circuit 310 than the NFC circuit of the targeted device. Transmissions from the accessory NFC circuit 110 may thereby undesirably interfere (collide) with transmissions from the targeted device, and prevent reliable receipt by the UE 300 of data from the NFC circuit of the targeted device.

However, in accordance with some embodiments disclosed herein, the accessory NFC circuit 110 is attached at a location on the housing 102 and configured to be powered by inductive coupling to signals emitted by the other NFC circuit 310 within the UE 300 to temporarily operate to transmit data to the UE NFC circuit 310 as the accessory NFC circuit 110 passes over the UE NFC circuit 310 while the housing 102 is being slid on the UE 300 before reaching the stored position relative to the UE 300.

In some further embodiments, the accessory NFC circuit 110 becomes powered by inductive coupling to signals emitted by the UE NFC circuit 310 to temporarily operate to transmit data to the UE NFC circuit 310 as the accessory NFC circuit 110 passes over the UE NFC circuit 310 while the housing 102 is being slid off the UE 300. Furthermore, while the housing 102 is in the stored position relative to the UE 300, the accessory NFC circuit 110 is inhibited or prevented from transmitting data to the UE NFC circuit 310 irrespective of whether the UE NFC circuit 310 is emitting signals to attempt to provide inductive coupling to the accessory NFC circuit 110.

While the housing 102 is in the stored position relative to the UE 300, the accessory NFC circuit 110 is too remotely located from the UE NFC circuit 310 to be sufficiently powered by any inductive coupling to signals emitted by the UE NFC circuit 310 to operate the transmit data, according to one embodiment. For example, as shown in the embodiment of FIG. 2, the housing 102 has a top 202 that is adjacent an ear speaker 340 (FIG. 3) of the UE 300 and a bottom 204 that is adjacent a microphone 342 (FIG. 3) of the UE 300 while the housing 102 is in the stored position relative to the UE 300. The accessory NFC circuit 110 is located adjacent the bottom of the housing 102 and spaced apart by distance 200 to be remote from the UE NFC circuit 310 located adjacent the ear speaker of the UE 300. A location where the accessory NFC circuit 110 is fixed to the accessory 100 can be selected to provide sufficient communication isolation between the NFC circuits 110 and 310 to inhibit or prevent data transmission by the accessory NFC circuit 110 while the housing 102 is in the stored position relative to the UE 300.

Figure 3:
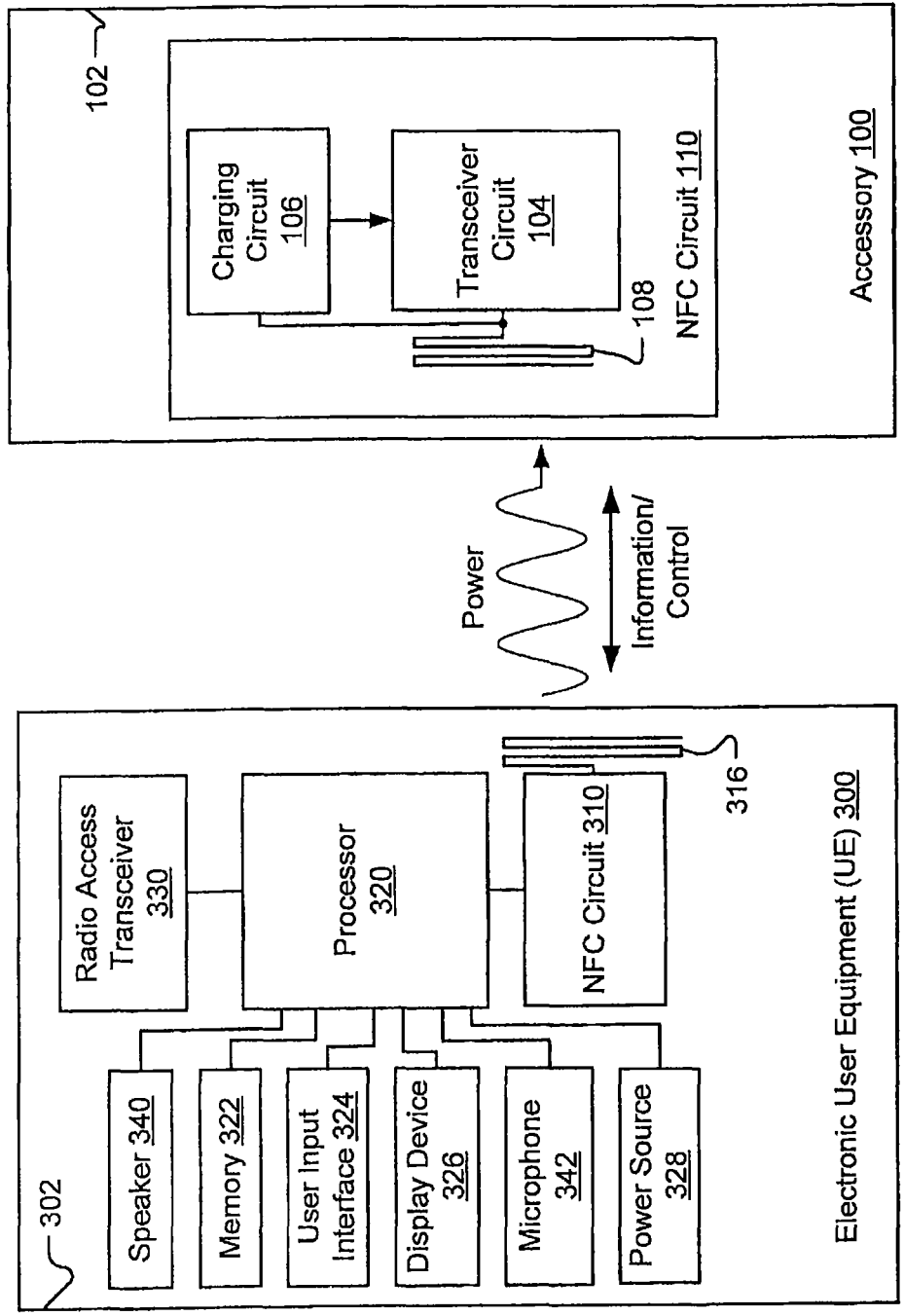
FIG. 3 is a block diagram of components of an accessory and a user equipment according to some embodiments.

FIG. 3 is a block diagram of components of the accessory 100 and the UE 300 that are connectable and configured to operate according to some embodiments. The UE 300 can include a housing 302, a processor circuit 320, a radio access transceiver 330, a NFC circuit 310, a memory device(s) 322, a display device 326, a user input interface 324 (e.g., touch sensitive interface for the display device 326, keypad/keyboard, button(s)/switch(es), etc.), a power source 328 (e.g., rechargeable battery) that supplies power to these and other components, a speaker 340, and a microphone 342. The radio access transceiver 330 may include, but is not limited to, a LTE or other cellular transceiver, Bluetooth transceiver, WiFi transceiver, WiMax transceiver, or other communication transceiver is configured to communicate with a network node of a telecommunications system. The processor 320 may include one or more data processing circuits, such as a general purpose and/or special purpose processor (e.g., microprocessor and/or digital signal processor). The processor 320 is configured to execute computer program instructions from functional modules in the memory 322, described below as a computer readable medium, to perform at least some of the operations and methods described herein as being performed by a user equipment.

The accessory 100 includes a NFC circuit 110 (accessory NFC circuit) that can be powered by and communicate with the UE NFC circuit 310 using short-range high frequency wireless communication technology which enables the exchange of data between devices over about a 10 cm distance, although the NFC circuits 110 and 310 are not limited to operating in at any defined range. The communication protocol and operation can be an extension of the ISO 14443 proximity-card standard (contactless card, RFID) and can be specified in the ECMA-340 and ISO/IEC 18092 technology standards. Some embodiments of the NFC circuits 110 and 310 may communicate using existing ISO 14443 smartcards and readers and can thereby be compatible with existing contactless communication infrastructure.

The NFC circuits 110 and 310 may communicate via magnetic field induction. A loop antenna 316 connected to the NFC circuit 310 and a loop antenna 108 of the accessory NFC circuit 110 are placed in close proximity to each other within the other's antenna near field, thereby effectively forming an air-core transformer. Some embodiments of the NFC circuits 110 and 310 can transmit within the globally available and unlicensed radio frequency ISM band of 13.56 MHz, with a bandwidth of almost 2 MHz. Some embodiments of the NFC circuits 110 and 310 can support data rates of 106, 212, or 424 kbit/s using a modified Miller coding or Manchester coding to encode and decode communicated data.

The accessory NFC circuit 110 can be configured to operate in a passive communication mode, because the accessory 100 does not have its own power source. In contrast, the UE NFC circuit 310 can be configured to operate in an active communication mode because of the power source 322 (FIG. 3), e.g., rechargeable battery, of the UE 300. When operating in the passive communication mode, the UE NFC circuit 310 provides a carrier field and the accessory NFC circuit 110 answers by modulating the carrier field. In this mode, the accessory NFC circuit 110 generates its operating power from the NFC circuit 310 provided electromagnetic field, thus making the accessory NFC circuit 110 a transponder. In some other embodiments the accessory NFC circuit 110 contains a power supply and is configured to operate in an active communication mode.

The NFC circuit 110 includes a charging circuit 106 that can become inductively coupled to the UE NFC circuit 310 through the antenna 108 to generate power therefrom, and which it provides to a transceiver circuit 104. The transceiver circuit 104 transmits data through the antenna 108 to the UE NFC circuit 310 using the power from the charging circuit 106. The transceiver circuit 104 may optionally be configured to receive data through the antenna 108 from the UE NFC circuit 310.

In one embodiment, the accessory NFC circuit 110 is configured to delay transmission of data to the UE NFC circuit 310 until expiration of a defined delay time after the NFC circuit 110 becomes sufficiently powered on to operate. Thus, for example, the transceiver circuit 104 can be configured to delay a defined time after it becomes powered on by the charging circuit 106 (through inductive coupling to the UE NFC circuit 310) before transmitting data through the antenna 108. Delaying the accessory NFC circuit's 110 data transmission may help avoid interfering with the ability of the UE NFC circuit 310 to communicate with a NFC circuit of a targeted device (e.g., which is configured to transmit data immediately upon being powering on) which a user is attempting to communicate with through the UE 300.

In a further embodiment, the accessory NFC circuit 110 is configured to receive a delay setting signal transmitted by the UE NFC circuit 310, and to set the defined delay time based on the delay setting signal. The UE 300 may thereby communicate the delay setting signal through the UE NFC circuit 310 to control how long the accessory NFC circuit 110 delays after being powered on before transmitting data.

The data transmitted by the accessory NFC circuit 110 may include, but is not limited to, a unique identifier or product identifier for the accessory 100, information identifying a feature of the accessory 100, etc. In one embodiment, the accessory NFC circuit 110 transmits a universal resource locator address as the data to the UE NFC circuit 310 that indicates where the UE 300 can obtain information from a network node of a communications system. The UE 300 can thereby communicate through the radio access transceiver 330 with the network node to, for example, download an application program for execution by the processor 320 of the UE 300, obtain text, graphics, photographic images (e.g., background display wallpaper), and/or video for display on the display device 326 of the UE 300, and/or obtain music or other audio data to be played through the speaker 340 of the UE 300.

In a further embodiment, the accessory NFC circuit 110 transmits a product code as the data to the UE NFC circuit 310 that activates functionality within the user equipment 300. The UE 300 may communicate through the radio access transceiver 330 to the network node to, for example, obtain an activation code for an application hosted by the UE 300.

Figure 4:
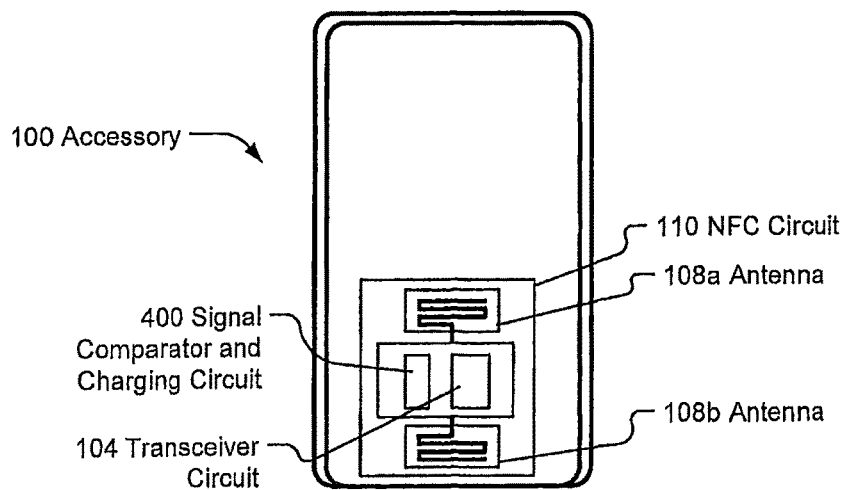
FIG. 4 illustrates components of an NFC circuit on an accessory and configured to avoid collisions with communications between a user equipment and another device having a NFC circuit according to some embodiments.
Figure 5:
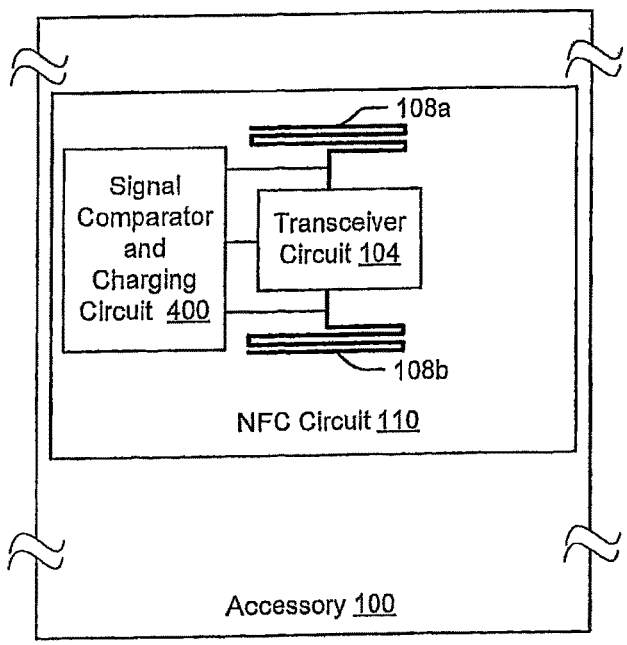
FIG. 5 illustrates further detail of the NFC circuit of FIG. 4 according to some embodiments.

FIG. 4 illustrates components of another embodiment of the NFC circuit 110 for the accessory 100 which is configured to avoid interfering with the ability of the UE NFC circuit 310 to communicate with a NFC circuit of a targeted device. FIG. 5 illustrates further details of the NFC circuit 110 of FIG. 4 which is configured according to some embodiments.

Referring to FIGS. 4 and 5, the accessory NFC circuit 110 includes a pair of antennas 108a and 108b, a signal comparator and charging circuit 400, and a transceiver 104. Each of antennas 108a and 108b is configured to be inductively coupled to the UE NFC circuit 310. The antennas 108a and 108b may extend in opposite directions from each other. For example, as shown in FIG. 5, one of the pair of antennas 108b can extend in a first direction along which the housing 102 is slid on the UE 300 and the other one of the pair of antennas 108a extends in an opposite second direction.

The transceiver 104 is configured to be powered by at least one of the pair of antennas 108a and 108b to operate to transmit data through at least one of the pair of antennas 108a and 108b to the UE NFC circuit 310. In one embodiment, the transceiver 104 is connected to transmit data through both of the antennas 108a and 108b.

The signal comparator and charging circuit 400 is connected to the pair of antennas 108a and 108b and configured to prevent the transceiver 104 from transmitting data to the UE NFC circuit 310 until subsequently triggering the transceiver 104 to transmit data to the UE NFC circuit 310 based on comparison of relative levels of signals from the pair of antennas 108a and 108b. In one embodiment, the signal comparator and charging circuit 400 is configured to trigger the transceiver 104 to transmit data to the UE NFC circuit 310 based on a difference between the levels of signals from the pair of antennas 108a and 108b being within a defined range.

The signal comparator and charging circuit 400 may include some of the functionality described herein for the charging circuit 106 of FIG. 3, or the charging functionality may reside in a separate component from the comparator functionality disclosed herein. Thus, the signal comparator and charging circuit disclosed herein may instead be referred to as a signal comparator circuit and a charging circuit.

In another embodiment, the signal comparator and charging circuit 400 is configured to trigger the transceiver 104 to transmit data to the UE NFC circuit 310 when comparison of relative levels of the signals from the pair of antennas 108a and 108b indicates that the UE NFC circuit is presently positioned equally distant from the pair of antennas 108a and 108b.

Another embodiment of the signal comparator and charging circuit 400 is configured to trigger the transceiver 104 to transmit data to the UE NFC circuit 310 when comparison of relative levels of signals from the pair of antennas 108a and 108b indicates that the UE NFC circuit 310 has reached a closest distance to the accessory NFC circuit 110 as the housing 102 is being slid on the UE 300 before reaching the stored position relative to the UE 300.

The signal comparator and charging circuit 400 can thereby operate to inhibit or prevent the transceiver 104 from transmitting data while the housing 102 is in the stored position relative to the UE 300. The accessory NFC circuit 110 may thereby avoid interfering with the ability of the UE NFC circuit 310 to communicate with a NFC circuit of a targeted device which a user is attempting to communicate with through the UE 300.

Figure 6:
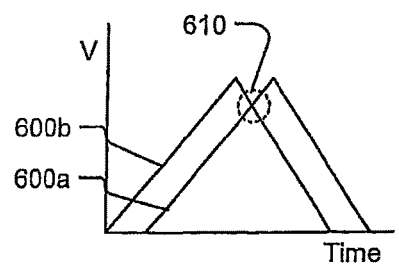
FIG. 6 illustrates graphs of example signals from a pair of antennas of the NFC circuit of FIG. 5 and a corresponding time when the signal comparator triggers the transceiver to transmit data, in accordance with one embodiment.

FIG. 6 illustrates graphs of example signals from a pair of antennas of the accessory NFC circuit 110 of FIG. 5 and a corresponding time 610 when the signal comparator and charging circuit 400 triggers the transceiver 104 to transmit data, in accordance with one embodiment. The graphs of FIG. 6 are exaggerated and simplified for purposes of explanation of various operations of the accessory NFC circuit 110 according to some embodiments, and are not limiting to those rather embodiments.

Referring to FIG. 6, As the accessory 100 is slid onto the UE 300 beginning at time 0, one antenna 108b is closer than the other antenna 108a to the antenna 316 of the UE 300 and, therefore, the signal 600b from antenna 108b is initially larger than the signal 600a from antenna 108a. The signal comparator and charging circuit 400 compares levels of the signals 600a and 600b and, based on the difference there between, prevents the transceiver circuit 104 from transmitting data although the accessory NFC circuit 110 may already have sufficient inductive coupling to the UE NFC circuit 310 to otherwise operationally power of the transceiver 104 to transmit data. As the accessory 100 is slid further onto the UE 300, the accessory NFC circuit 110, becomes positioned equally distant from the pair of antennas 108a and 108b and which causes the signals 600a and 600b to be about equal at time 610. Thus, at time 610 the signal comparator and charging circuit 400 can respond to their being less than a threshold difference between the signals 600a and 600b by triggering the transceiver 104 to transmit data to the UE NFC circuit 310 through one or both of the antennas 108a and 108b.

Figure 7:
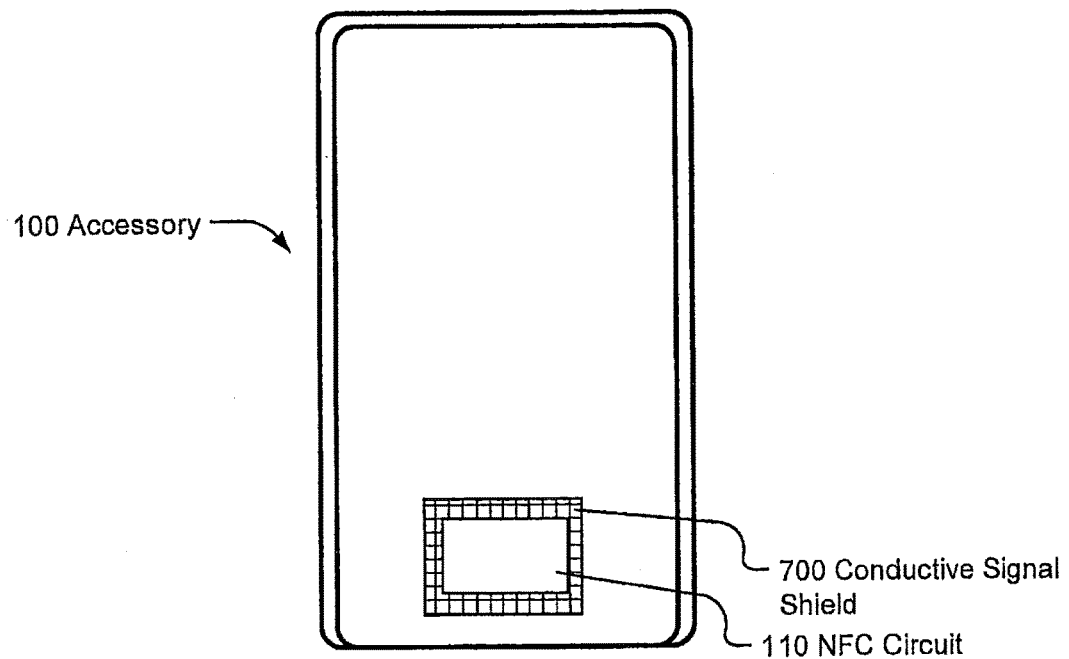
FIG. 7 illustrates an embodiment of a conductive signal shield that shields a NFC circuit on an accessory from some of the signals provided by a NFC circuit in the user equipment to avoid interference with communications between the NFC circuit of the user equipment and another device having a NFC circuit.
Figure 8:
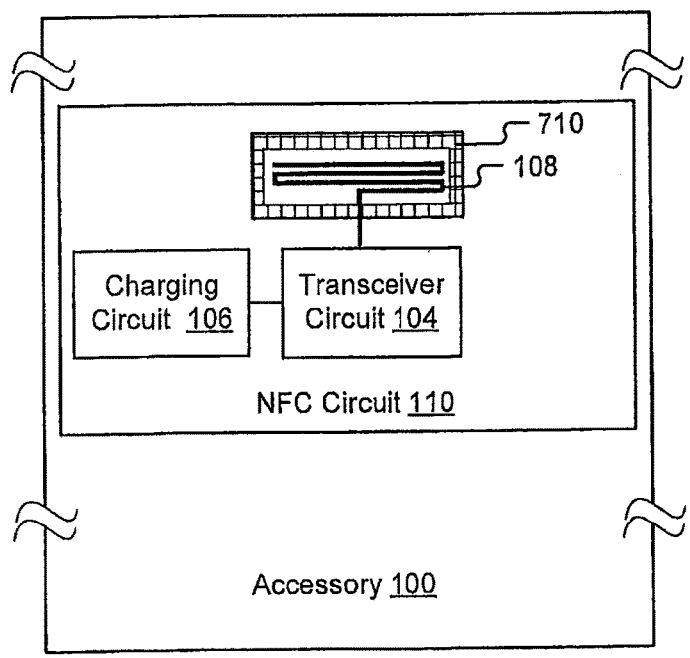
FIG. 8 illustrates another embodiment of a conductive signal shield that shields some communications from a NFC circuit on an accessory to avoid collisions with communications between a user equipment and another device having a NFC circuit.

FIG. 7 illustrates an embodiment of a conductive signal shield 700 that shields the accessory NFC circuit 110 from some of the signals provided by the UE NFC 310 to avoid interference with communications between the UE NFC 310 and another device having a NFC circuit. FIG. 8 illustrates another embodiment of a conductive signal shield 710 that shields the accessory NFC circuit 110 from some of the signals provided by the UE NFC 310.

The conductive signal shield 700, 710 can be attached at a location on the housing 102 that is between the accessory NFC circuit 110 and the UE NFC circuit 310 while the housing 102 is in the stored position relative to the UE 300 to decrease inductive coupling of the accessory NFC circuit 110 to signals emitted by the UE NFC circuit 310 and substantially prevent the accessory NFC circuit 110 from transmitting data while the housing 102 is in the stored position relative to the UE 300. The conductive signal shield 700, 710 may be a conductive metal layer or mesh that extends along one side of the antenna 108, covers one major plane of the antenna 108, or surrounds the antenna 108.

The conductive signal shield 700, 710 may be electrically connected to a floating ground that is used by the charging circuit 106 in order to decrease inductive coupling of the accessory NFC circuit 110 to signals emitted by the UE NFC circuit 310. Alternatively or additionally, the conductive signal shield 700, 710 may be electrically connected to a floating ground that is used by the transceiver circuit 104 to adjust the transmission signal strength of the transceiver circuit 104 based on the inductive coupling to signals emitted by the UE NFC circuit 310, and substantially prevent the accessory NFC circuit 110 from transmitting data while the housing 102 is in the stored position relative to the UE 300.

In the embodiment of FIG. 8, the conductive signal shield 710 extends between the antenna 108 and the UE NFC circuit 310 to inhibit inductive coupling between the antenna 108 and the UE NFC circuit 310 while the housing 102 is in the stored position relative to the UE 300. The antenna 108 may be a conductive line pattern extending along a plane, such as shown, and the conductive signal shield 710 can extend across the plane to cover one side of the conductive line pattern.

FURTHER DEFINITIONS AND EMBODIMENTS

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When a node is referred to as being "connected", "coupled", "responsive", or variants thereof to another node, it can be directly connected, coupled, or responsive to the other node or intervening nodes may be present. In contrast, when an node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. An accessory for a user equipment, the accessory comprising:
   a housing that is slid on the user equipment to become attached in a stored position relative to the user equipment; and
   a near field communication (NFC) circuit attached at a location on the housing and configured to become powered by inductive coupling to signals emitted by another NFC circuit within the user equipment to temporarily operate to transmit data to the other NFC circuit within the user equipment as the NFC circuit passes over the other NFC circuit while the housing is being slid on the user equipment before reaching the stored position relative to the user equipment,
   wherein while the housing is in the stored position relative to the user equipment, the NFC circuit is inhibited from transmitting data to the other NFC circuit within the user equipment irrespective of whether the other NFC circuit is emitting signals to attempt to provide inductive coupling to the NFC circuit.

2. The accessory of claim 1, wherein:
   the NFC circuit is further configured to become powered by inductive coupling to signals emitted by the other NFC circuit within the user equipment to temporarily operate to transmit data to the other NFC circuit within the user equipment as the NFC circuit passes over the other NFC circuit while the housing is being slid off the user equipment.

3. The accessory of claim 1, wherein:
   while the housing is in the stored position relative to the user equipment, the NFC circuit is too remotely located from the other NFC circuit within the user equipment to be sufficiently powered by any inductive coupling to signals emitted by the other NFC circuit to operate the transmit data.

4. The cover of claim 3, wherein:
   the housing has a top that is adjacent an ear speaker of the user equipment and a bottom that is adjacent a microphone of the user equipment while the housing is in the stored position relative to the user equipment, and the NFC circuit is located adjacent the bottom of the housing and remote from the other NFC circuit located adjacent the ear speaker of the user equipment.

5. The accessory of claim 1, wherein the accessory comprises a cover configured to protect a back surface of the user equipment.

6. The accessory of claim 1, wherein the accessory comprises a stand that supports and holds the user equipment in a defined orientation.

7. The accessory of the claim 1, wherein the NFC circuit is configured to delay transmission of the data to the other NFC circuit of the user equipment until expiration of a defined delay time after the NFC circuit becomes sufficiently powered on to operate.

8. The accessory of the claim 7, wherein the NFC circuit is configured to receive a delay setting signal transmitted by the other NFC circuit of the user equipment, and to set the defined delay time based on the delay setting signal.

9. The accessory of the claim 1, wherein the NFC circuit is configured to transmit a universal resource locator address as the data to the other NFC circuit within the user equipment that indicates where the user equipment can obtain information from a network node of a communications system.

10. The accessory of the claim 1, wherein the NFC circuit is configured to transmit a product code as the data to the other NFC circuit within the user equipment that activates functionality within the user equipment.

11. An accessory for a user equipment, the accessory comprising:
    a housing that is slid on the user equipment to become attached in a stored position relative to the user equipment; and
    a near field communication (NFC) circuit attached at a location on the housing and configured to become powered by inductive coupling to signals emitted by another NFC circuit within the user equipment to temporarily operate to transmit data to the other NFC circuit within the user equipment as the NFC circuit passes over the other NFC circuit while the housing is being slid on the user equipment before reaching the stored position relative to the user equipment,
    wherein the NFC circuit comprises:
    a pair of antennas, each antenna is configured to be inductively coupled to the other NFC circuit within the user equipment;
    a transceiver configured to be powered by at least one of the pair of antennas to operate to transmit data through at least one of the pair of antennas to the other NFC circuit within the user equipment; and
    a signal comparator and charging circuit connected to the pair of antennas and configured to prevent the transceiver from transmitting data to the other NFC circuit within the user equipment until subsequently triggering the transceiver to transmit data to the other NFC circuit based on comparison of relative levels of signals from the pair of antennas.

12. The accessory of claim 11, wherein:
    the pair of antennas extend in opposite directions from each other.

13. The accessory of claim 12, wherein:
    one of the pair of antennas extends in a first direction along which the housing is slid on the user equipment and the other one of the pair of antennas extends in an opposite second direction.

14. The accessory of claim 11, wherein:
    the signal comparator and charging circuit is configured to trigger the transceiver to transmit data to the other NFC circuit based on a difference between the levels of signals from the pair of antennas being within a defined range.

15. The accessory of claim 11, wherein:
    the signal comparator and charging circuit is configured to trigger the transceiver to transmit data to the other NFC circuit within the user equipment when comparison of relative levels of the signals from the pair of antennas indicates that the other NFC circuit within the user equipment is presently positioned equally distant from the pair of antennas.

16. The accessory of claim 11, wherein:
    the signal comparator and charging circuit is configured to trigger the transceiver to transmit data to the other NFC circuit within the user equipment when comparison of relative levels of signals from the pair of antennas indicates that the other NFC circuit within the user equipment has reached a closest distance to the NFC circuit as the housing is being slid on the user equipment before reaching the stored position relative to the user equipment.

17. The accessory of claim 11, wherein the accessory comprises a cover configured to protect a back surface of the user equipment.

18. An accessory for a user equipment, the accessory comprising:
a housing that is slid on the user equipment to become attached in a stored position relative to the user equipment;
a near field communication (NFC) circuit attached at a location on the housing and configured to become powered by inductive coupling to signals emitted by another NFC circuit within the user equipment to temporarily operate to transmit data to the other NFC circuit within the user equipment as the NFC circuit passes over the other NFC circuit while the housing is being slid on the user equipment before reaching the stored position relative to the user equipment; and
a conductive signal shield attached at a location on the housing that is between the NFC circuit and the other NFC circuit within the user equipment while the housing is in the stored position relative to the user equipment to decrease inductive coupling of the NFC circuit to signals emitted by the other NFC circuit and substantially prevent the NFC circuit from transmitting data while the housing is in the stored position relative to the user equipment.

19. The accessory of claim 18, wherein:
the NFC circuit comprises:
an antenna configured to be inductively coupled to the other NFC circuit within the user equipment; and
a transceiver configured to be powered by the antenna to operate to transmit data through the antenna to the other NFC circuit within the user equipment,
the conductive signal shield extends between the antenna and the other NFC circuit within the user equipment to inhibit inductive coupling between the antenna and the other NFC circuit while the housing is in the stored position relative to the user equipment.

20. The accessory of claim 19, wherein:
the antenna is a conductive line pattern extending along a plane; and
the conductive signal shield extends across the plane to cover one side of the conductive line pattern.

\* \* \* \* \*